UNITED STATES PATENT OFFICE.

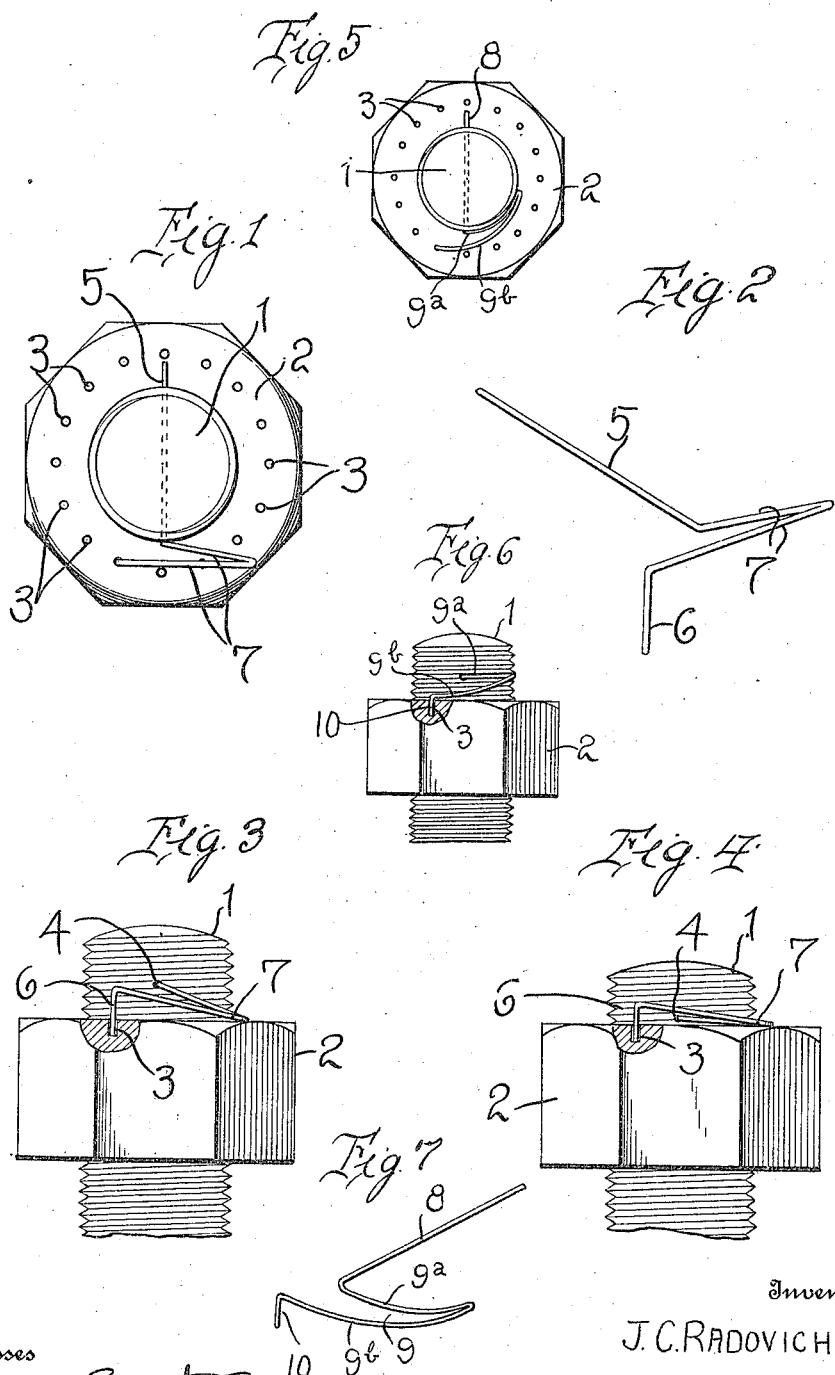

JOHN C. RADOVICH, OF BISBEE, ARIZONA.

NUT-LOCK.

1,184,872.

Specification of Letters Patent.

Patented May 30, 1916.

Application filed July 14, 1915. Serial No. 39,872.

*To all whom it may concern:*

Be it known that I, JOHN C. RADOVICH, a citizen of the United States, residing at Bisbee, in the county of Cochise and State of Arizona, have invented certain new and useful Improvements in Nut-Locks, of which the following is a specification, reference being had to the accompanying drawings.

My invention relates to certain new and useful improvements in nut locks, and has for its object to provide means for locking nuts upon bolts consisting of a single piece of stiff spring wire which shall be readily and economically produced and applied with facility to the nut and bolt, and with this end in view my invention consists in the details of construction and arrangement hereinafter and more particularly described.

In order that those familiar with the art to which my invention appertains may know how to make and apply my improved nut lock and to appreciate its advantages I will proceed to describe the same referring by numerals to the accompanying drawing in which, Figure 1 is an end view of a bolt and nut and showing my improved nut lock; Fig. 2 is a perspective view of the locking wire disassociated from the bolt and nut; Fig. 3 is a side view partly in section of a bolt and nut and showing the position of the locking wire when its seat in the bolt is considerably distant from the face of the nut; Fig. 4 is a similar view when the wire seat in the bolt is nearer to the face of the nut; Fig. 5 is a face view of a nut and bolt showing a modified form of my locking device applied thereto; Fig. 6 is a side view, partly broken away, of the construction shown in Fig. 5; and Fig. 7 is a perspective detailed view of the locking wire or device separate from the nut and bolt.

Similar reference numerals indicate like parts in the several figures of the drawing.

1 represents an ordinary screw bolt and 2, an ordinary nut. The nut is provided with a series of vertical recesses or pockets 3 arranged as shown at Fig. 1 equidistant from the center, and 4 is a diametric channel through the bolt.

The locking device consists of a single piece of comparatively stiff spring wire of the form clearly shown in Fig. 2 and comprising a comparatively long arm 5 adapted to be located in the diametric channel 4 of the bolt, and with a shorter arm 6 at right angles to the arm 5, the body of the wire between the two arms being bent into a V-form as shown at 7. The arm 5 is preferably made of sufficient length to pass entirely through the bolt and to have its free end project slightly as shown at Fig. 1 and the arm 6 is of such length that it may be adapted to the conditions shown at Fig. 3 or cut off and shortened to meet the conditions shown at Fig. 4.

In applying my improved lock to a bolt and nut provided with a channel 4, and recesses or pockets 3, the nut 2 is threaded onto the bolt and when it has been screwed home the long arm 5 of the wire is passed through the channel 4 of the bolt and the shorter arm 6 is located in one of the pockets 3 in the nut in alinement with the arm 6, the V-shaped portion intermediate the two arms yielding sufficiently for raising the arm 6 sufficiently so that it will seat itself as shown in Figs. 3 and 4.

When the conditions are such as shown at Fig. 4 and where the channel 4 in the bolt approaches nearer to the face of the nut than as shown at Fig. 3, the arm 6 may be shortened accordingly by cutting off a portion of it. When the locking wire has been thus arranged relatively to the bolt and nut it will be obvious that any tendency of the nut to work off the bolt will be resisted and prevented by the arms 5 and 6 and with the V-shaped body against the face of the nut.

In Fig. 7 I show a preferable form of my wire locking device. In this form 8 designates the comparatively long arm of the locking device equivalent to the arm 5, and 10 the short arm extending at right angles to the arm 8 and connected thereto by the V-shaped portion 9. This V-shaped portion corresponds to the V-shaped portion 7 in Fig. 2, but the difference between the construction shown in Fig. 7 and that shown in Fig. 2 is that this V-shaped portion 9 is curved so that the leg $9^a$ of this V-shaped portion will fit the threads of the bolt, as shown clearly in Fig. 6, the other leg of the V-shaped portion being curved but on a larger radius. The arm 8 is of course made of sufficient length to pass entirely through the bolt, as shown in Fig. 5, and the terminal end 10 is adapted to be disposed in the recess 3 in the nut 2 in the manner previously described for the form shown in Fig. 6.

It will be seen that with the form shown in Figs. 5, 6, and 7, a greater resistance is offered to the rotation of the bolt, and while there is as much spring vertically (the leg $9^a$ of the device being disposed in a higher plane than the downwardly and outwardly inclined leg $9^b$), yet there is less chance of the nut turning and bending the V-shaped portion than there is in the construction shown in Fig. 2.

In speaking of the locking device as composed of stiff spring wire I mean it to be understood that it should be stiff enough to prevent the nut from working off the bolt, and yet provide sufficient spring action for locating the short arm 6 in the recess or pocket 3 in the face of the nut and the V-shape is given to the wire for this purpose.

I of course do not wish to be confined to any particular dimensions of the wire structure or to any particular gage of wire so long as the device is adapted to be used and operates as hereinbefore explained.

It will be seen that by providing a plurality of recesses or holes 3 disposed at uniform distances around the nut that the nut may be held in any desired position and that thus lost motion between the nut and work will be obviated. It will be seen that the locking device consists of a spring metal wire bent to provide four elements, as for instance, 8, $9^a$, $9^b$ and 10, these elements being disposed in angular relation to each other and all in one plane, the fourth element, as the element 10, being disposed approximately at right angles to the plane of the other three elements when the device is not under tension.

What I claim as new and desire to secure by Letters Patent is:

1. A nut lock comprising a resilient metal rod bent to form a straight bolt engaging member, then laterally bent, then bent upon itself and extended in an acute angle to the laterally bent portion and beyond said bolt engaging member, the extremity of the returned portion of the rod being bent at right angles to the bolt engaging member.

2. In combination with a bolt having a diametric channel, and a nut having a series of recesses, a locking device consisting of a single piece of wire bent to provide an arm adapted to be disposed in the channel through the bolt, a shorter arm extending approximately at right angles to the longer arm, and a V-shaped resilient portion intermediate and connecting the two arms, said portion being curved so that one leg thereof will engage in the threads of the bolt the legs being disposed respectively at an angle to the longer and shorter arms.

3. The combination with a bolt having a diametric channel, and a nut having a series of vertical recesses in its face, of a locking device consisting of a single piece of wire having a relatively long bolt engaging arm adapted to be located in the channel of the bolt, a V-shaped portion at the end of the long arm, one leg of the V-shaped portion being longer than the other, the extremity of the relatively long leg of the V-shaped portion being bent at right angles to the long arm and being adapted to be received in any one of the recesses in the face of the nut the short leg being disposed at an angle to the bolt engaging portion.

4. The combination with a bolt having a diametric channel, and a nut having a series of vertical recesses in its face, of a locking device consisting of a single piece of wire bent to provide a relatively long bolt engaging arm adapted to be located in the channel in the bolt, a shorter arm extending at right angles to the first named arm and adapted to be disposed in any one of the recesses in the face of the nut, and a V-shaped resilient portion intermediate and connecting the two arms, said V-shaped portion having one leg longer than the other, the shorter leg being curved to conform to the curvature of the periphery of the bolt whereby it may be engaged with the threads thereof, the shorter leg of the V-shaped portion being bent at right angles to the bolt engaging arm and the longer leg being disposed at an angle to the shorter nut engaging arm.

In testimony whereof I hereunto affix my signature in the presence of two witnesses.

JOHN C. RADOVICH.

Witnesses:
ALEXANDER MURRY,
GEO. J. REARDON.

Copies of this patent may be obtained for five cents each, by addressing the "Commissioner of Patents, Washington, D. C."